US012621917B2

(12) United States Patent
Hsu

(10) Patent No.: US 12,621,917 B2
(45) Date of Patent: May 5, 2026

(54) 2.4 G WIRELESS INTERCONNECTED LIGHT CONTROL SYSTEM

(71) Applicant: DONGGUAN JIASHENG LIGHTING TECHNOLOGY CO., LTD., Dongguan (CN)

(72) Inventor: Chih-Pin Hsu, Dongguan (CN)

( * ) Notice: Subject to any disclaimer, the term of this patent is extended or adjusted under 35 U.S.C. 154(b) by 153 days.

(21) Appl. No.: 18/646,810

(22) Filed: Apr. 26, 2024

(65) Prior Publication Data

US 2024/0298397 A1 Sep. 5, 2024

(30) Foreign Application Priority Data

Mar. 7, 2024 (CN) ......................... 202420449277.1

(51) Int. Cl.
*H05B 47/19* (2020.01)
*H05B 45/34* (2020.01)

(52) U.S. Cl.
CPC ............. *H05B 47/19* (2020.01); *H05B 45/34* (2020.01)

(58) Field of Classification Search
CPC ......... H05B 45/34; H05B 47/19; Y02B 20/40
See application file for complete search history.

(56) References Cited

U.S. PATENT DOCUMENTS

2009/0045986 A1* 2/2009 Fabrenius ............. G06F 3/0202 341/22
2016/0323981 A1* 11/2016 Clark ....................... F21V 23/04
2017/0155244 A1* 6/2017 Dickey .................. H03K 17/74
2018/0124881 A1 5/2018 Loomis et al.
2018/0160512 A1* 6/2018 Dolan ...................... F21S 8/065
2020/0383193 A1 12/2020 Pauly, II et al.
2023/0078085 A1* 3/2023 Xu .......................... H02M 1/36 363/21.02
2023/0247749 A1 8/2023 Pauly, II et al.
2025/0261294 A1* 8/2025 Cisneros .............. H05B 47/196

FOREIGN PATENT DOCUMENTS

CN 110996448 A * 4/2020
CN 210761303 U * 6/2020

OTHER PUBLICATIONS

Machine Translation of CN210761303U (Year: 2020).*
Machine Translation of CN110996448A (Year: 2020).*

* cited by examiner

*Primary Examiner* — Raymond R Chai
(74) *Attorney, Agent, or Firm* — Addison D. Ault; IPGentleman Intellectual Property Services, LLC

(57) ABSTRACT

A 2.4 G wireless interconnected light control system, including a voltage regulator module, a driving module, a main control module, a wireless module, a transceiver module, and a matrix module; the voltage regulator module is configured to output regulated power supply after stepping down and stabilizing an input voltage; the matrix module is configured to generate an input signal; the main control module is configured to receive and process the input signal, and input the processed input signal to the wireless module; the driving module is configured to drive a light string group according to a control signal from the main control module; the wireless module is configured to facilitate communication between the main control module and the transceiver module; and the transceiver module is configured to convert a signal inputted by the wireless module to an electromagnetic wave signal and broadcast the electromagnetic wave signal.

6 Claims, 7 Drawing Sheets

2.4 G WIRELESS INTERCONNECTED LIGHT CONTROL SYSTEM

TECHNICAL FIELD

The present disclosure relates to the technical field of light control, and particularly relates to a 2.4 G wireless interconnected light control system.

BACKGROUND

Currently, the light control solutions for LED lights on the market are mainly divided into two types, that is, physical switch control and mobile phone APP control. The physical switch control usually includes wired control and wireless control, but a physical switch is often fixed at one location, making light adjustment extremely inconvenient in practical implementation. While the mobile phone APP control addresses the shortcoming of fixed switch, it is not very friendly for some elderly users due to its high degree of intelligence and complicated operation.

Therefore, the prior art needs to be further improved and developed.

SUMMARY

In order to solve the above defects in the prior art, an objective of the present disclosure is to provide a 2.4 G wireless interconnected light control system to solve the problems of inconvenient light adjustment and control in the prior art.

The technical solution of the present disclosure is as follows:

a 2.4 G wireless interconnected light control system, including a voltage regulator module, a driving module, a main control module, a wireless module, a transceiver module, and a matrix module;

one end of the voltage regulator module is connected to the main control module, the other end of the voltage regulator module is connected to the wireless module, and the voltage regulator module is configured to output regulated power supply after stepping down and stabilizing an input voltage;

the matrix module is connected to the main control module, and the matrix module is configured to generate an input signal;

one end of the main control module is connected to the voltage regulator module, one end of the main control module is connected to the wireless module, the other end of the main control module is connected to the matrix module, and the main control module is configured to receive and process the input signal and input the processed input signal to the wireless module.

the driving module is connected to the main control module, and is configured to drive a light string group according to a control signal from the main control module.

one end of the wireless module is connected to the main control module, the other end of the wireless module is connected to the transceiver module, and the wireless module is configured to facilitate communication between the main control module and the transceiver module; and the transceiver module is connected to the wireless module, and is configured to convert a signal inputted by the wireless module to an electromagnetic wave signal and then broadcast the electromagnetic wave signal.

In a further arrangement of the present disclosure, the voltage regulator module includes a first capacitor, a second capacitor, a third capacitor, and a first chip;

one end of the first capacitor is connected to an input voltage, and the other end thereof is connected to ground;

the second capacitor and the first capacitor are connected in parallel;

an input terminal of the first chip is connected to one end of the first capacitor, and an output terminal of the first chip is connected to one end of the third capacitor; and the other end of the third capacitor is connected to the ground.

In a further arrangement of the present disclosure, the wireless module includes a fourth capacitor, a fifth capacitor, a sixth capacitor, a seventh capacitor, an eighth capacitor, a second chip, a first crystal oscillator and a first resistor;

a twentieth pin of the second chip is connected to the ground, a nineteenth pin of the second chip is connected to the sixth capacitor, an eighteenth pin of the second chip is connected to the ground, and a sixteenth pin of the second chip is connected to the first resistor;

a ninth pin of the second chip is connected to one end of the seventh capacitor, a tenth pin of the second chip is connected to one end of the eighth capacitor, the other end of the seventh capacitor is connected to the ground, and the other end of the eighth capacitor is connected to the ground;

one end of the first crystal oscillator is connected to one end of the seventh capacitor, and the other end of the first crystal oscillator is connected to the other end of the eighth capacitor;

the other end of the sixth capacitor is connected to one end of the fifth capacitor;

the other end of the fifth capacitor is connected to one end of the fourth capacitor; and the one end of the fourth capacitor is connected to the input voltage, and the other end thereof is connected to the ground.

In a further arrangement of the present disclosure, the transceiver module includes a first inductor, a second inductor, a third inductor, a ninth capacitor, a tenth capacitor, an eleventh capacitor, and a twelfth capacitor;

one end of the first inductor is connected to one end of the second inductor, and the other end thereof is connected to one end of the ninth capacitor;

the other end of the ninth capacitor is connected to the ground;

the other end of the second inductor is connected to one end of the third inductor, the other end of the third inductor is connected to one end of the twelfth capacitor, and the other end of the twelfth capacitor is connected to the ground; and the eleventh capacitor and the twelfth capacitor are connected in parallel.

In a further arrangement of the present disclosure, the driving module includes a first driving unit and a second driving unit;

the first driving unit includes a second resistor, a first MOS transistor, a third resistor, a fourth resistor, a first LED, and a first diode;

one end of the second resistor is connected to one end of the first LED, and the other end thereof is connected to an input terminal of the driving module;

the other end of the first LED is connected to a drain of the first MOS transistor, a source of the first MOS transistor is connected to the ground, and a gate of the first MOS transistor is connected to the fourth resistor;

the third resistor is connected in parallel to the gate of the first MOS transistor and the source of the first MOS transistor; and a cathode of the first diode is connected to the drain of the first MOS transistor, and an anode of the first diode is connected to the source of the first MOS transistor.

In a further arrangement of the present disclosure, the second driving unit includes a fifth resistor, a second MOS transistor, a sixth resistor, a seventh resistor, a second LED, and a second diode;

one end of the fifth resistor is connected to one end of the second LED, and the other end thereof is connected to the input terminal of the driving module;

the other end of the second LED is connected to a drain of the second MOS transistor, a source of the second MOS transistor is connected to the ground, and a gate of the second MOS transistor is connected to the seventh resistor;

the sixth resistor is connected in parallel to the gate of the second MOS transistor and the source of the second MOS transistor; and a cathode of the second diode is connected to the drain of the second MOS transistor, and an anode of the second diode is connected to the source of the second MOS transistor.

In a further arrangement of the present disclosure, the matrix module includes an LED matrix unit and a key matrix unit;

the key matrix unit includes: N key row pins, N key column pins, and N×N keys;

the N key row pins and the N key column pins are arranged in a crossed manner;

the key row pins and the key column pins are staggered to form N×N intersection points, and each of the intersection points is provided with the key;

where N is a natural number greater than zero.

In a further arrangement of the present disclosure, the LED matrix unit includes: N LED row pins, N LED column pins, and 2N×N LEDs.

the N LED row pins and the N key column pins are arranged in a crossed manner;

the LED row pins and the LED column pins are staggered to form N×N intersection points, and each of the intersection points is provided with two LEDs.

In a further arrangement of the present disclosure, the main control module includes a single-chip microcomputer.

The present disclosure provides a 2.4 G wireless interconnected light control system, including: a voltage regulator module, a driving module, a main control module, a wireless module, a transceiver module, and a matrix module; and the voltage regulator module is configured to output regulated power supply after stepping down and stabilizing an input voltage; the matrix module is configured to generate an input signal; the main control module is configured to receive and process the input signal and input the processed input signal to the wireless module; the driving module is configured to drive a light string group according to a control signal from the main control module; the wireless module is configured to facilitate communication between the main control module and the transceiver module; and the transceiver module is configured to convert a signal inputted by the wireless module to an electromagnetic wave signal and then broadcast the electromagnetic wave signal. The present disclosure provides a 2.4 G wireless networking pairing control system between lamp, which can easily realize independent control over one lamp, independent control over more lamps, and simultaneous control over many lamps, thereby effectively avoid limitations resulting from tedious wiring control caused by lamp string control.

BRIEF DESCRIPTION OF THE DRAWINGS

In order to more clearly illustrate the technical solution in embodiments of the present disclosure or in the prior art, a brief introduction to the accompanying drawings required for the description of the embodiments or the prior art will be provided below. Obviously, the accompanying drawings in the following description are merely some embodiments of the present disclosure. Those of ordinarily skilled in the art would also derive other accompanying drawings from these accompanying drawings without making inventive efforts.

DETAILED DESCRIPTIONS OF THE EMBODIMENTS

Figure 1:
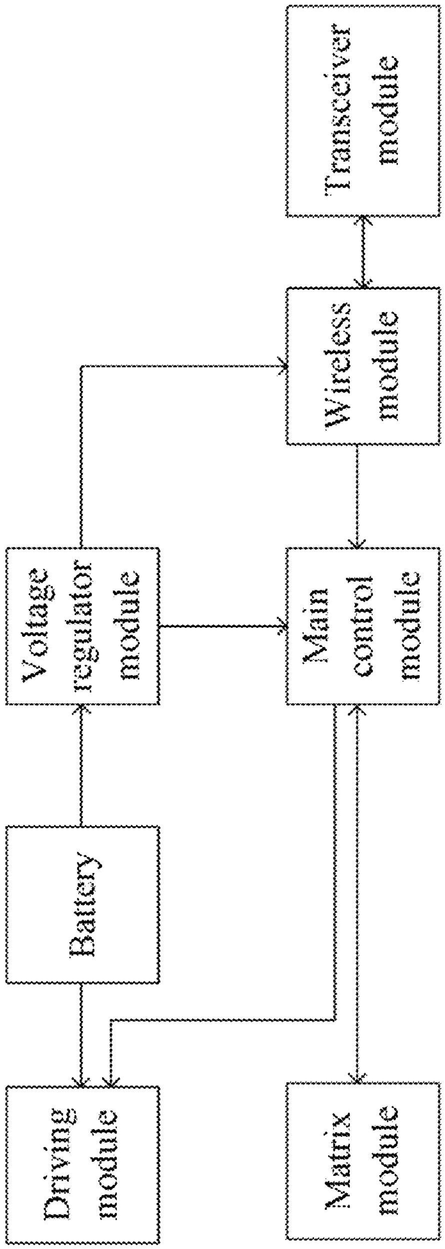
FIG. 1 is a schematic diagram of a 2.4 G wireless interconnected light control system according to the present disclosure.

The present disclosure provides a 2.4 G wireless interconnected light control system. In order to make the objectives, technical solutions, and effects of the present disclosure clearer, the present disclosure will be further described in detail below with reference to the accompanying drawings and examples. It should be understood that the specific embodiments described herein are merely used to explain the present disclosure and are not intended to limit the present disclosure.

In the embodiments and the patent scope of the application, unless otherwise specifically defined herein, "a", "an", "said" and "the" may also include plural forms. Under the condition that embodiments of the present disclosure involve descriptions of "first", "second", etc., the descriptions of "first", "second", etc. are for descriptive purposes only and are not to be construed as indicating or implying their relative importance or implicitly specifying the number of indicated technical features. Thus, a feature defined with "first" and "second" may explicitly or implicitly include at least one of the features.

It should be further understood that the word "comprise/include" used in the specification of the present disclosure means presence of stated features, integers, steps, operations, elements and/or components, but does not exclude the presence or addition of one or more other features, integers, steps, operations, elements, components and/or groups thereof. It should be understood that when an element is referred to as being "connected" or "coupled" to another element, it may be directly connected or coupled to another element, or intervening elements may also be present. In addition, "connected" or "coupled" as used herein may include wireless connections or wireless couplings. As used herein, the term "and/or" includes all or any unit and all combinations of one or more of the associated listed items.

It can be understood by those skilled in the art that unless otherwise defined, all terms (including technical terms and scientific terms) used herein have the same meanings as those generally understood by those skilled in the art to which the present disclosure belongs. It should also be understood that terms such as those defined in a general dictionary should be understood to have meanings consistent with those in the context of the prior and will not be interpreted in idealized or overly formal meanings unless specifically defined as herein.

In addition, the technical solutions of the embodiments may be combined with one another, which must be based on the achievement by those of ordinary skill in the art, and when the combinations of the technical solutions contradict one another or cannot be achieved, it should be considered that the combinations of the technical solutions do not exist and do not fall within the scope of protection claimed in the present disclosure.

The inventor made research and found that the light control solutions for LED lights on the market were mainly divided into two types, that is, physical switch control and mobile phone APP control. The physical switch control usually includes wired control and wireless control, but a physical switch is often fixed in one place, making light adjustment extremely inconvenient in practical implementation. While the mobile phone APP control addresses the shortcoming of fixed switch, it is not very user-friendly for some elderly users due to its high degree of intelligence and complicated operation.

In view of the above technical problems, the present disclosure provides a 2.4 G wireless interconnected light control system to solve the problem of inconvenient light adjustment and control in the prior art.

With reference to FIGS. 1-7, a preferred embodiment of a 2.4 G wireless interconnected light control system is provided.

With reference to FIG. 1, FIG. 1 is a schematic diagram of a 2.4 G wireless interconnected light control system in this embodiment, and the system includes a voltage regulator module, a driving module, a main control module, a wireless module, a transceiver module, and a matrix module. Further, this embodiment also includes a battery, where the battery serves as power supply of the system, and the battery is connected to the voltage regulator module to supply power for the entire system.

One end of the voltage regulator module is connected to the main control module, the other end of the voltage regulator module is connected to the wireless module, and the voltage regulator module is configured to output regulated power supply after stepping down and stabilizing an input voltage; The matrix module is connected to the main control module, and the matrix module is configured to generate an input signal. One end of the main control module is connected to the voltage regulator module, one end of the main control module is connected to the wireless module, the other end of the main control module is connected to the matrix module, and the main control module is configured to receive and process the input signal and input the processed input signal to the wireless module. The driving module is connected to the main control module, and is configured to drive a light string group according to a control signal from the main control module. One end of the wireless module is connected to the main control module, the other end of the wireless module is connected to the transceiver module, and the wireless module is configured to facilitate communication between the main control module and the transceiver module. The transceiver module is connected to the wireless module, and is configured to convert a signal inputted by the wireless module to an electromagnetic wave signal and then broadcast the electromagnetic wave signal.

Figure 2:
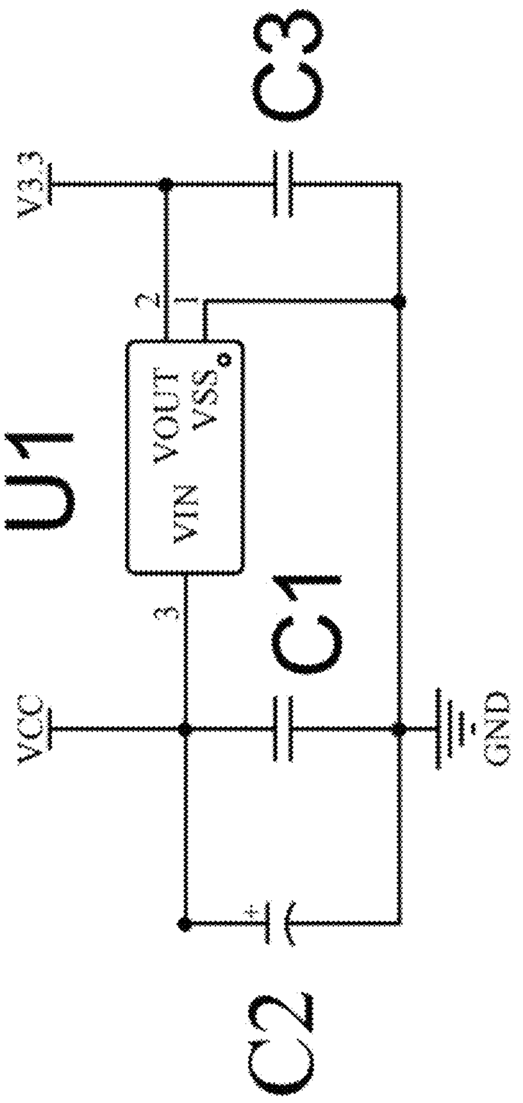
FIG. 2 is a circuit diagram of a voltage regulator module according to the present disclosure.

With reference to FIG. 2, FIG. 2 is a circuit diagram of a voltage regulator module according to the present disclosure, and the voltage regulator module includes a first capacitor C1, a second capacitor C2, a third capacitor C3, and a first chip U1.

Specifically, one end of the first capacitor C1 is connected to an input voltage, and the other end thereof is connected to ground; the second capacitor C2 and the first capacitor C1 are connected in parallel; an input terminal of the first chip U1 is connected to one end of the first capacitor C1, and an output terminal of the first chip U1 is connected to one end of the third capacitor C3; and the other end of the third capacitor C3 is connected to the ground. In this embodiment, after an input voltage of the battery voltage inputted to the voltage regulator module is subjected to voltage reduction and voltage stabilization through the voltage regulator module to provide clean and stable power supply for the wireless module and the main control module.

In this embodiment, an AMS117 voltage regulator chip is selected as the first chip U1.

Figure 3:
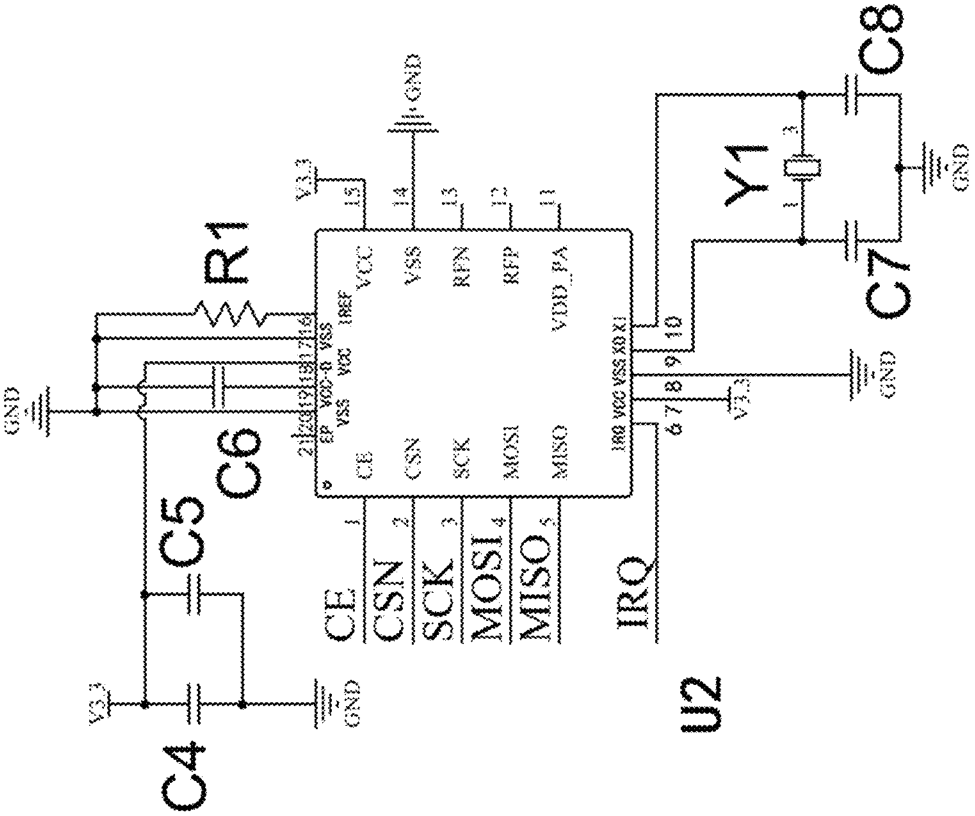
FIG. 3 is a circuit diagram of a wireless module according to the present disclosure.

With reference to FIG. 3, FIG. 3 is a circuit diagram of a wireless module according to the present disclosure, and the wireless module includes a fourth capacitor C4, a fifth capacitor C5, a sixth capacitor C6, a seventh capacitor C7, an eighth capacitor C8, a second chip U2, a first crystal oscillator Y1 and a first resistor R1.

Specifically, a twentieth pin of the second chip U2 is connected to the ground, a nineteenth pin of the second chip U2 is connected to the sixth capacitor C6, an eighteenth pin of the second chip U2 is connected to the ground, and a sixteenth pin of the second chip U2 is connected to the first resistor R1; a ninth pin of the second chip U2 is connected to one end of the seventh capacitor C7, a tenth pin of the second chip U2 is connected to one end of the eighth capacitor C8, the other end of the seventh capacitor C7 is connected to the ground, and the other end of the eighth capacitor C8 is connected to the ground; one end of the first crystal oscillator Y1 is connected to one end of the seventh capacitor C7, and the other end of the first crystal oscillator Y1 is connected to the other end of the eighth capacitor C8; the other end of the sixth capacitor C6 is connected to one end of the fifth capacitor C5; the other end of the fifth capacitor C5 is connected to one end of the fourth capacitor C4; and the one end of the fourth capacitor C4 is connected to the input voltage, and the other end thereof is connected to the ground. In this embodiment, an Si2401 chip is selected as the second chip U2.

Under the condition that the power supply is normal, the wireless module can perform SPI communication with the main control module, and can send the signal received through a transceiver circuit to the main control module, and further, the wireless module can also broadcast information that needs to be sent by the main control module through the transceiver module.

Figure 4:
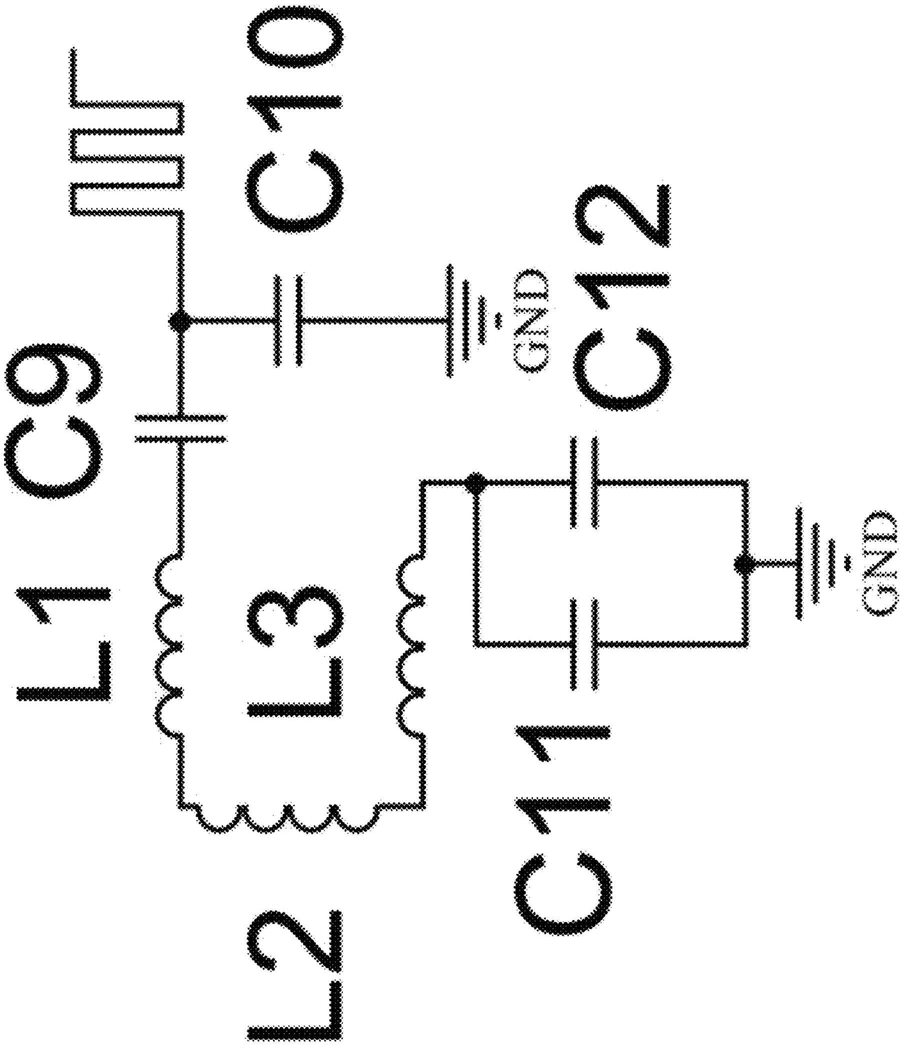
FIG. 4 is a circuit diagram of a transceiver module according to the present disclosure.

With reference to FIG. 4, FIG. 4 is a circuit diagram of a transceiver module according to the present disclosure, and the transceiver module includes a first inductor L1, a second inductor L2, a third inductor L3, a ninth capacitor C9, a tenth capacitor C10, an eleventh capacitor C11, and a twelfth capacitor C12.

One end of the first inductor L1 is connected to one end of the second inductor L2, and the other end thereof is connected to one end of the ninth capacitor C9; the other end of the ninth capacitor C9 is connected to the ground; the other end of the second inductor L2 is connected to one end of the third inductor L3, the other end of the third inductor L3 is connected to one end of the twelfth capacitor C12, and the other end of the twelfth capacitor C12 is connected to the ground; and the eleventh capacitor C11 and the twelfth capacitor C12 are connected in parallel.

The transceiver module can convert an electrical signal generated by the second chip U2 in the wireless module into a 2.4 G frequency-band electromagnetic wave signal and broadcast the electromagnetic wave signal, and the transceiver module can also receive a 2.4 G frequency-band electromagnetic wave signal generated by other modules and convert the electromagnetic wave signal into an electrical signal capable of being recognized by the second chip U2 in the wireless module, so that the second chip U2 in the wireless module can perform related signal processing.

Figure 5:
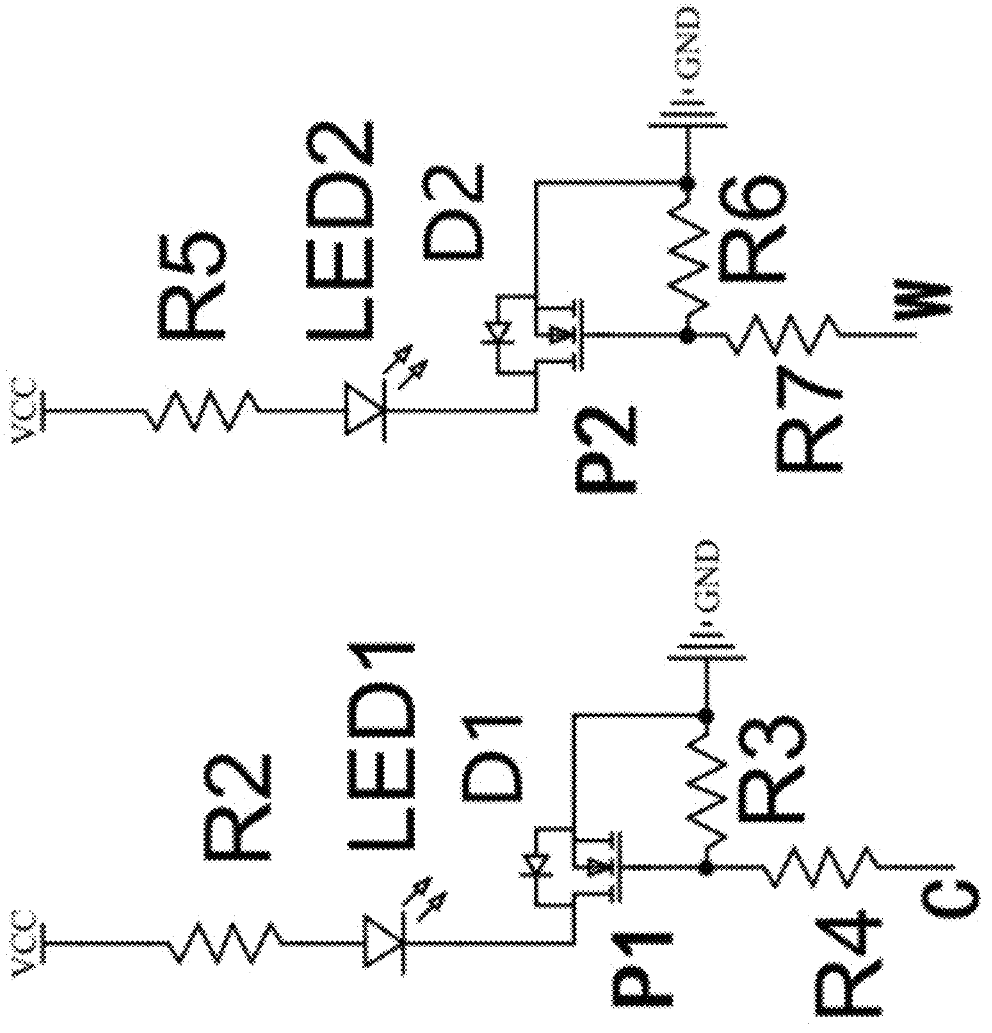
FIG. 5 is a circuit diagram of a driving module according to the present disclosure.

With reference to FIG. 5, FIG. 5 is a circuit diagram of a driving module according to the present disclosure, and the driving module includes a first driving unit and a second driving unit.

The first driving unit includes a second resistor R2, a first MOS transistor P1, a third resistor R3, a fourth resistor R4, a first LED (LED 1), and a first diode D1.

One end of the second resistor R2 is connected to the first LED (LED 1), and the other end thereof is connected to an input terminal of the driving module; the other end of the first LED (LED 1) is connected to a drain of the first MOS transistor P1, a source of the first MOS transistor P1 is connected to the ground, and a gate of the first MOS transistor P1 is connected to the fourth resistor R4; the third resistor R3 is connected in parallel to the gate of the first MOS transistor P1 and the source of the first MOS transistor P1; and the first diode D1 is connected in parallel to the drain and the source of the first MOS transistor P1, where the first LED (LED 1) can be a warm-color lamp bead.

The second driving unit includes a fifth resistor R5, a second MOS transistor P2, a sixth resistor R6, a seventh resistor R7, a second LED (LED 2), and a second diode D2.

One end of the fifth resistor R5 is connected to one end of the second LED (LED 2), and the other end thereof is connected to the input terminal of the driving module; the other end of the second LED is connected to a drain of the second MOS transistor P2, a source of the second MOS transistor P2 is connected to the ground, and a gate of the second MOS transistor P2 is connected to the seventh resistor R7; the sixth resistor R6 is connected in parallel to the gate of the second MOS transistor P2 and the source of the second MOS transistor P2; and the second diode D2 is connected in parallel to the drain and the source of the second MOS transistor P2, where the second LED (LED 2) can be a cold-color lamp bead.

The first driving unit and the second driving unit can be a warm-color lamp bead driving circuit and a cold-color lamp bead driving circuit, respectively, both of which control on-off time ratios of the first MOS transistor P2 and the second MOS transistor P2 to regulate ON time of the first LED (LED 1) and the second LED (LED 2) by receiving the control signal from the main control module, that is, a PWM signal, thereby controlling brightness of the LED. Under the condition that the brightness is the same, brightness and color temperature of the first LED (LED 1) and the second LED (LED 2) can be further controlled by adjusting brightness ratios of the first LED (LED 1) and the second LED (LED 2) to achieve color mixing.

Figure 6:
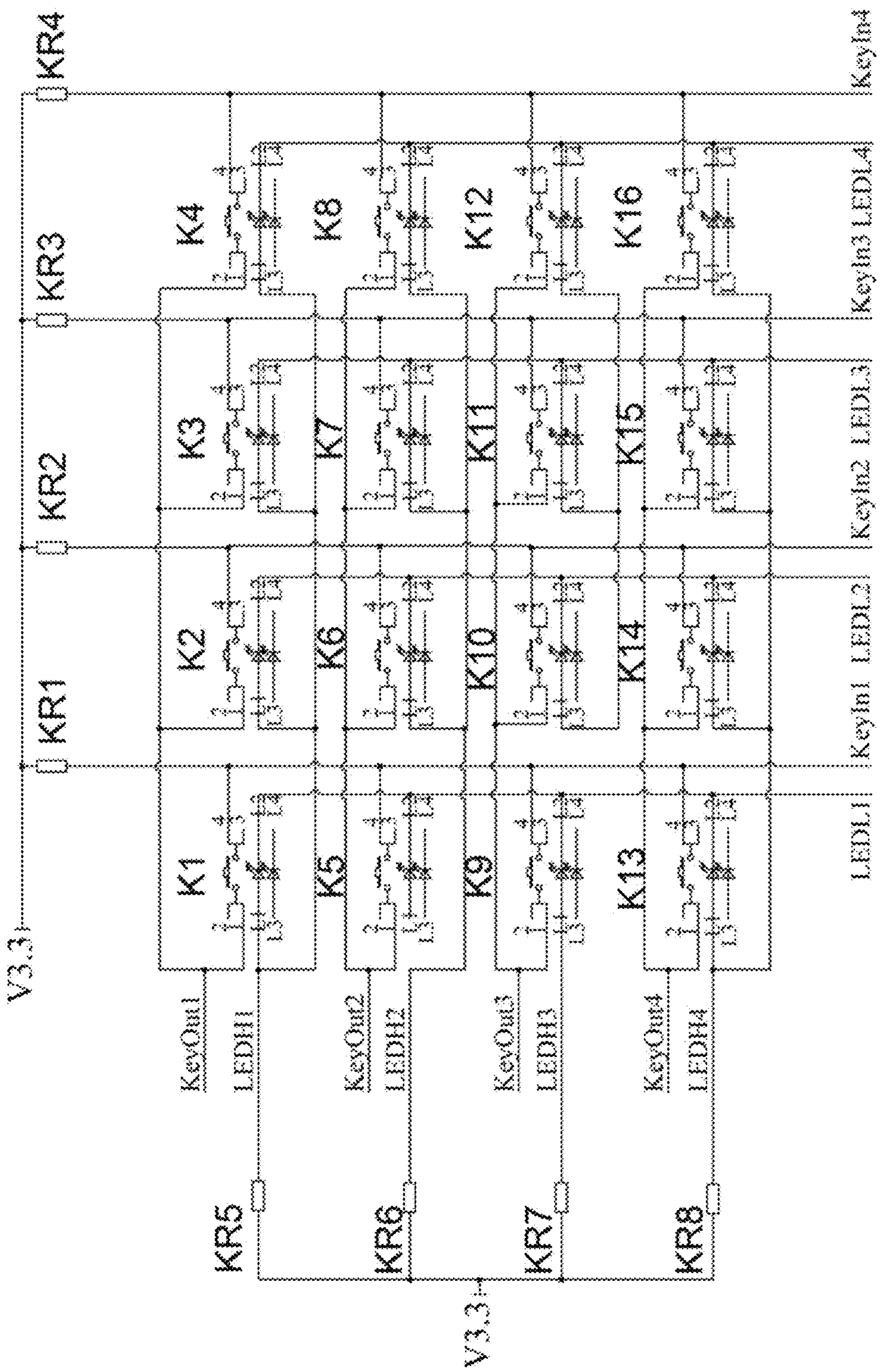
FIG. 6 is a circuit diagram of a matrix module according to the present disclosure.

With reference to FIG. 6, FIG. 6 is a circuit diagram of a matrix module according to the present disclosure, and the matrix module includes an LED matrix unit and a key matrix unit.

The key matrix unit includes: N key row pins, N key column pins, and N×N keys; the N key row pins and the N key column pins are arranged in a crossed manner; the key row pins and the key column pins are staggered to form N×N intersection points, and each of the intersection points is provided with the key; where N is a natural number greater than zero.

The LED matrix unit includes: N LED row pins, N LED column pins, and 2N×N LEDs. The N LED row pins and the N key column pins are arranged in a crossed manner; the LED row pins and the LED column pins are staggered to form N×N intersection points, and each of the intersection points is provided with LEDs.

In this embodiment, the matrix module is composed of a 4×4 key matrix unit and a 4*4 LED matrix unit, and the key matrix unit has four key row pins (KeyIn 1, KeyIn 2, KeyIn 3, and KeyIn 4) and four key column pins (KeyOut 1, KeyOut 2, KeyOut 3, and KeyOut 4). The four key row pins and the four key column pins are staggered to form 4*4 intersection point, and each of the intersection points is provided with the key (K1, K2, K3, . . . K16). The key matrix unit is configured to generate an input signal for human mechanical input, and send the input signal to the main control module.

Specifically, the our key row pins KeyIn 1, KeyIn 2, KeyIn 3, and KeyIn 4 are connected to seventeenth, eighteenth, nineteenth, and twentieth pins, respectively, of a single-chip microcomputer in the main control module, the four key column pins KeyOut 1, KeyOut 2, KeyOut 3, and KeyOut 4 are connected to thirteenth, fourteenth, fifteenth, and sixteenth pins, respectively, of the single-chip microcomputer in the main control module, and the main control module detects the condition of each key by scanning states the control row pins and the control column pins of the key matrix unit.

With reference to FIG. 6, the 4×4 key matrix unit is divided into: number matrices (0, 1, 2 . . . 9) of ten light string groups; two color temperature adjustment matrices (color temperature +, color temperature −), two brightness adjustment matrices (brightness +, brightness −); one ONOFF matrix; and one MUTE matrix.

The LED matrix unit has four LED row pins (LEDL1, LEDL2, LEDL3, LEDL4) and four LED column pins (LEDH1, LEDH2, LEDH3, LEDH4). The LED matrix unit is configured to power on and off of LED indicator lights according to the control signal, that is, an indicator light control signal, from the main control module. Specifically, in this embodiment, two LEDs are arranged on each intersection point, and LEDs in the LED matrix unit are the indicator lights, where a K6-6151S light-emitting diode is selected as the LED indicator light. Further, each key row pin (KeyIn 1, KeyIn 2, KeyIn 3, or KeyIn 4) and each LED column pin (LED1, LED2, LEDH 3, or LEDH 4) are connected in series with a resistor (KR1, KR2, . . . . KR8).

Specifically, the four LED row pins LEDL1, LEDL2, LEDL3, and LDL 4 are connected to twenty-fifth, twenty-sixth, twenty-seventh, twenty-eight pins, respectively, of the single-chip microcomputer in the main control module, the four LED column pins LED1, LED2, LEDH 3, and LEDH 4 are connected to twenty-first, twenty-second, twenty-third, twenty-fourth pins, respectively, of the single-chip microcomputer in the main control module, and the main control module controls the on-off of the indicator light by controlling level states of the LED row pins and the LED column pins of the LED matrix unit.

Further, the matrix module can provide a human-computer interaction interface between a user and the system, and convert a signal inputted by the user into an electrical signal capable of being recognized by the main control module, so that the main control module can perform recognition processing. Further, the main control module can control the on-off of the LED indicator light on a key, so that a group number where a current main control lamp is located.

In this embodiment, the LED matrix unit corresponds to the 4×4 key matrix unit, which is also divided into: number matrices (0, 1, 2 . . . 9) of ten light string groups; two color temperature adjustment matrices (color temperature +, color temperature −), two brightness adjustment matrices (brightness +, brightness −); one ONOFF matrix; and one MUTE matrix.

Specifically, in actual operation, a key of any lamp is selected, the number key (0-9) of the light string group is short-pressed, and the group number of the lamp to be controlled is selected, in which case, the indicator light of the corresponding group number will light up. Under the condition that all groups need to be powered on, the indicator light of MUTE will light up when an MUTE key is short-pressed, indicating that all the groups are successfully selected.

Then, the "brightness +" or the "brightness −" key is pressed, and the brightness of the light string group of the selected group will be increased or decreased according to the brightness of the control signal. The "color temperature +" or "color temperature −" key is selected, the color temperature of the light string group of the selected group will vary according to the control signal.

Figure 7:
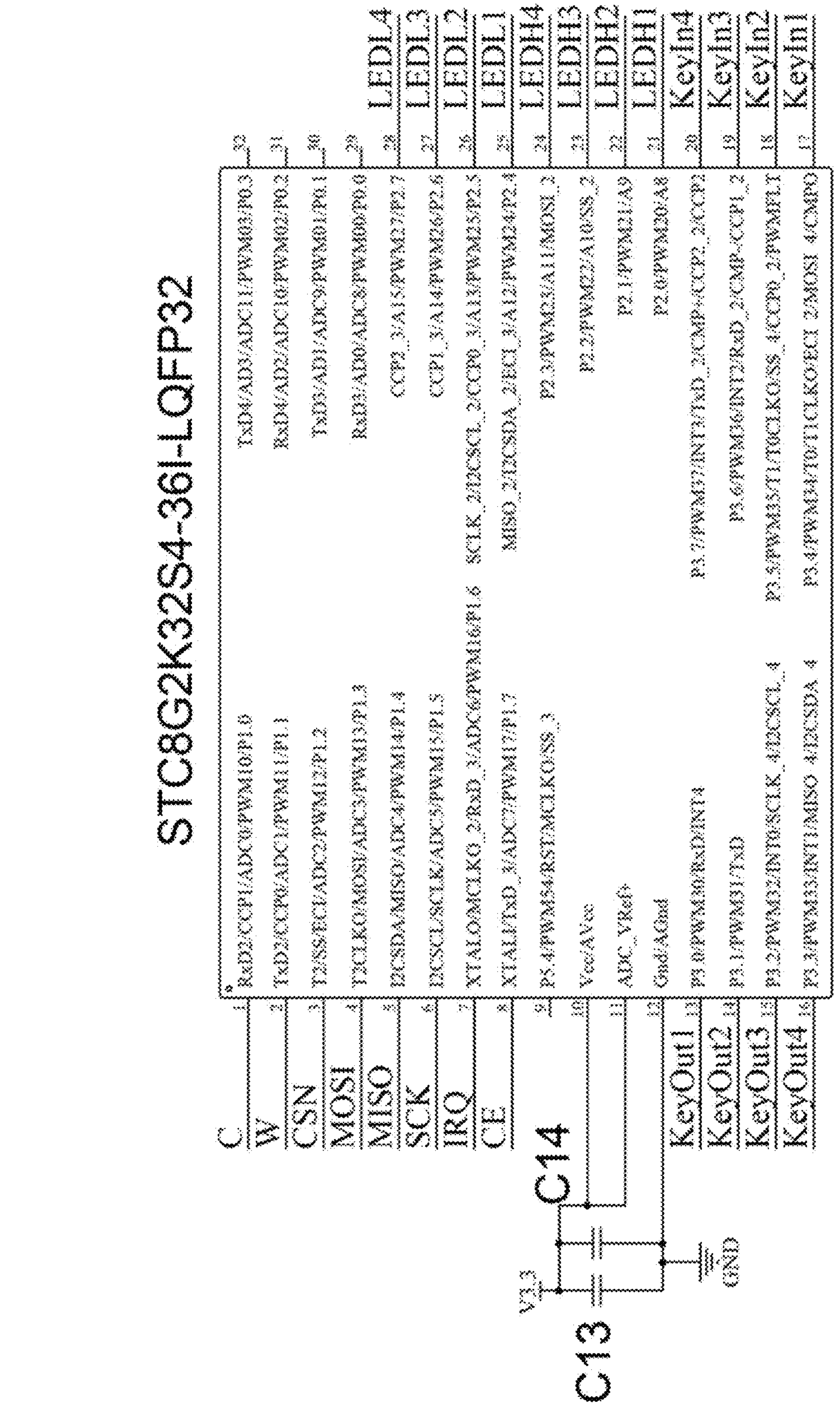
FIG. 7 is a circuit diagram of a main control module according to the present disclosure.

With reference to FIG. 7, FIG. 7 is a circuit diagram of a main control module according to the present disclosure, and the main control module includes a single-chip microcomputer, a thirteenth capacitor C13, and a fourteenth capacitor C14. In this embodiment, a model of the single-chip microcomputer is STC8G2K32S4-36I-LQFP32.

Specifically, an eleventh pin of the single-chip microcomputer is connected to one end of the fourteenth capacitor C14, a twelfth pin of the single-chip microcomputer is connected to the other end of the fourteenth capacitor C14, and the thirteenth capacitor C13 is connected in parallel to the fourteenth capacitor C14. Further, one end of the thirteenth capacitor C13 is connected to an input terminal of the main control module, and the other end thereof is connected to the ground. The thirteenth, fourteenth, fifteenth and sixteenth pins of the single-chip microcomputer are connected to the key column pins KeyOut 1, KeyOut 2, KeyOut 3 and KeyOut 4, respectively, of the matrix module, the twenty-fifth, twenty-sixth, twenty-seventh and twenty-eighth pins of the single-chip microcomputer are connected to the key row pins KeyIn 1, KeyIn 2, KeyIn 3, and KeyIn 4, respectively, the twenty-first, twenty-second, twenty-third, twenty-fourth pins of the single-chip microcomputer are connected to the four LED column pins LEDH1, LEDH2, LEDH3, and LEDH4, respectively, and the twenty-fifth, twenty-sixth, and twenty-sixth pins of the single-chip computer are connected to the LED row pins LEDL1, LEDL2, LEDL3, and LEDL4, respectively.

The main control module can receive the input signal from the matrix module, and further, the main control module can process information, such as number, LED brightness, color temperature, ONOFF of the light strip group according to the inputted signal, perform packet processing according to a specific protocol, send to the wireless module through the SPI communication, and broadcast through the transceiver circuit. At the same time, the main control module needs to receive a message queue received by the wireless module through the SPI communication, receive and unpack data packets in the message queue, and determine whether it is necessary to perform operations such as controlling the brightness, color temperature and ONOFF of the light string group through the driving module according to group information after the message queue is unpacked.

The present disclosure provides a 2.4 G wireless interconnected light control system, including: a voltage regulator module, a driving module, a main control module, a wireless module, a transceiver module, and a matrix module; and the voltage regulator module is configured to output regulated power supply after stepping down and stabilizing an input voltage; the matrix module is configured to generate an input signal; the main control module is configured to receive and process the input signal and input the processed input signal to the wireless module; the driving module is configured to drive a light string group according to a control signal from the main control module; the wireless module is configured to facilitate communication between the main control module and the transceiver module; and the transceiver module is configured to convert a signal inputted by the wireless module to an electromagnetic wave signal and then broadcast the electromagnetic wave signal. The present disclosure provides a 2.4 G wireless networking pairing control system between lamp, which can easily realize independent control over one lamp, independent control over more lamps, and simultaneous control over many lamps, thereby effectively avoid limitations resulting from tedious wiring control caused by lamp string control.

It should be understood that the application of the present disclosure is not limited to the above examples. For those ordinarily skilled in the art, improvements or variations can be made based on the foregoing description, and all these improvements or variations shall fall within the scope of protection of the appended claims of the present disclosure.

What it claimed is:

1. A 2.4 G wireless interconnected light control system, comprising a voltage regulator module, a driving module, a main control module, a wireless module, a transceiver module, and a matrix module;

- a first end of the voltage regulator module is connected to the main control module, a second end of the voltage regulator module is connected to the wireless module, and the voltage regulator module is configured to output regulated power supply after stepping down and stabilizing an input voltage;
- the matrix module is connected to the main control module, and the matrix module is configured to generate an input signal;
- the main control module is connected to the voltage regulator module, the wireless module, and the matrix module, and the main control module is configured to receive and process the input signal, and input the processed input signal to the wireless module;
- the driving module is connected to the main control module, and the driving module is configured to drive a light string group according to a control signal from the main control module;
- a first end of the wireless module is connected to the main control module, a second end of the wireless module is connected to the transceiver module, and the wireless module is configured to facilitate communication between the main control module and the transceiver module; and the transceiver module is connected to the wireless module, and the transceiver module is configured to convert a signal inputted by the wireless module to an electromagnetic wave signal and then broadcast the electromagnetic wave signal:

wherein the wireless module comprises a fourth capacitor, a fifth capacitor, a sixth capacitor, a seventh capacitor, an eighth capacitor, a second chip, a first crystal oscillator and a first resistor;

a twentieth pin of the second chip is connected to the ground, a nineteenth pin of the second chip is connected to the sixth capacitor, an eighteenth pin of the second chip is connected to the ground, and a sixteenth pin of the second chip is connected to the first resistor;

a ninth pin of the second chip is connected to a first end of the seventh capacitor, a tenth pin of the second chip is connected to a first end of the eighth capacitor, a second end of the seventh capacitor is connected to the ground, and a second end of the eighth capacitor is connected to the ground;

a first end of the first crystal oscillator is connected to a first end of the seventh capacitor, and a second end of the first crystal oscillator is connected to a second end of the eighth capacitor;

a second end of the sixth capacitor is connected to ground;

a second end of the fifth capacitor is connected to a first end of the fourth capacitor; and the first end of the fourth capacitor is connected to the input voltage, and a second end of the fourth capacitor is connected to ground;

wherein the driving module comprises a first driving unit and a second driving unit;

the first driving unit comprises a second resistor, a first MOS transistor, a third resistor, a fourth resistor, a first LED, and a first diode;

a first end of the second resistor is connected to a first end of the first LED, and a second end of the second resistor is connected to an input terminal of the driving module;

a second end of the first LED is connected to a drain of the first MOS transistor, a source of the first MOS transistor is connected to the ground, and a gate of the first MOS transistor is connected to the fourth resistor;

the third resistor is connected in parallel to the gate of the first MOS transistor and the source of the first MOS transistor; and a cathode of the first diode is connected to the drain of the first MOS transistor, and an anode of the first diode is connected to the source of the first MOS transistor;

wherein the matrix module comprises an LED matrix unit and a key matrix unit;

the key matrix unit comprises: N key row pins, N key column pins, and N×N keys;

the N key row pins and the N key column pins are arranged in a crossed manner; and the key row pins and the key column pins are staggered to form N×N intersection points, and each of the intersection points is provided with the key; wherein N is a natural number greater than zero.

2. The 2.4 G wireless interconnected light control system according to claim 1, wherein the voltage regulator module comprises a first capacitor, a second capacitor, a third capacitor, and a first chip;

a first end of the first capacitor is connected to the input voltage, and a second end of the first capacitor is connected to ground;

the second capacitor and the first capacitor are connected in parallel;

an input terminal of the first chip is connected to a first end of the first capacitor, and an output terminal of the first chip is connected to a first end of the third capacitor; and a second end of the third capacitor is connected to the ground.

3. The 2.4 G wireless interconnected light control system according to claim 1, wherein the transceiver module comprises a first inductor, a second inductor, a third inductor, a ninth capacitor, a tenth capacitor, an eleventh capacitor, and a twelfth capacitor;

a first end of the first inductor is connected to a first end of the second inductor, and a second end of the first inductor is connected to a first end of the ninth capacitor;

a second end of the ninth capacitor is connected to the ground;

a second end of the second inductor is connected to a first end of the third inductor, a second end of the third inductor is connected to a first end of the twelfth capacitor, and a second end of the twelfth capacitor is connected to the ground; and the eleventh capacitor and the twelfth capacitor are connected in parallel.

4. The 2.4 G wireless interconnected light control system according to claim 1, wherein the second driving unit comprises a fifth resistor, a second MOS transistor, a sixth resistor, a seventh resistor, a second LED, and a second diode;

a first end of the fifth resistor is connected to a first end of the second LED, and a second end of the fifth resistor is connected to the input terminal of the driving module;

a second end of the second LED is connected to a drain of the second MOS transistor, a source of the second MOS transistor is connected to the ground, and a gate of the second MOS transistor is connected to the seventh resistor;

the sixth resistor is connected in parallel to the gate of the second MOS transistor and the source of the second MOS transistor; and a cathode of the second diode is connected to the drain of the second MOS transistor, and an anode of the first diode is connected to the source of the second MOS transistor.

5. The 2.4 G wireless interconnected light control system according to claim 1, wherein the LED matrix unit comprises: N LED row pins, N LED column pins, and 2N×N LEDs;

the N LED row pins and the N key column pins are arranged in a crossed manner; and the LED row pins and the LED column pins are staggered to form N×N intersection points, and each of the intersection points is provided with two LEDs.

6. The 2.4 G wireless interconnected light control system according to claim 1, wherein the main control module comprises a single-chip microcomputer.

* * * * *